United States Patent
Ware et al.

(10) Patent No.: US 7,291,326 B2
(45) Date of Patent: Nov. 6, 2007

(54) COMPOSITIONS AND METHODS FOR REDUCING THE PATHOGEN CONTENT OF MEAT AND MEAT PRODUCTS

(75) Inventors: Douglas R. Ware, Indianapolis, IN (US); Mindy M. Brashears, Lubbock, TX (US)

(73) Assignee: Nutrition Physiology Corporation, Amarillo, TX (US)

( * ) Notice: Subject to any disclaimer, the term of this patent is extended or adjusted under 35 U.S.C. 154(b) by 327 days.

(21) Appl. No.: 10/707,674

(22) Filed: Dec. 31, 2003

(65) Prior Publication Data

US 2004/0131603 A1    Jul. 8, 2004

Related U.S. Application Data

(60) Provisional application No. 60/319,838, filed on Jan. 6, 2003.

(51) Int. Cl.
  *A23B 4/14* (2006.01)
  *A23B 4/20* (2006.01)
(52) U.S. Cl. .................................. 424/93.45
(58) Field of Classification Search ............. 424/94.45, 424/93.45
  See application file for complete search history.

(56) References Cited

U.S. PATENT DOCUMENTS

| | | |
|---|---|---|
| 5,374,433 A | 12/1994 | Bowling et al. |
| 5,576,035 A | 11/1996 | Bowling et al. |
| 5,869,113 A | 2/1999 | Clayton et al. |
| 6,039,984 A | 3/2000 | Bowling et al. |
| 6,287,610 B1 | 9/2001 | Bowling et al. |
| 6,569,474 B2 | 5/2003 | Clayton et al. |
| 7,063,836 B2 * | 6/2006 | Garner et al. ............ 424/93.45 |
| 7,169,415 B2 | 1/2007 | Bowling et al. |
| 2007/0054008 A1 | 3/2007 | Clayton et al. |

OTHER PUBLICATIONS

Winkowski et al Appl. Enviro. Microbiol Aug. 1993 59 (8) 2552-2557.*
Pidcock et al Int. Jour. Food Microbiol 76 (2002) 75-81.*

* cited by examiner

*Primary Examiner*—Herbert J. Lilling
(74) *Attorney, Agent, or Firm*—Novak Druce & Quigg, LLP

(57) ABSTRACT

Compositions and methods useful for reducing or eliminating the presence of pathogens in meat and meat products are disclosed. Administration of one or more lactic acid producing microorganisms to a live animal, to a carcass, to meat, to meat products, or in animal feed results in significant reductions in the amount of pathogens potentially harmful to humans when ingested. Synergistic effects can be achieved with the administration of multiple strains of microorganisms.

27 Claims, 2 Drawing Sheets

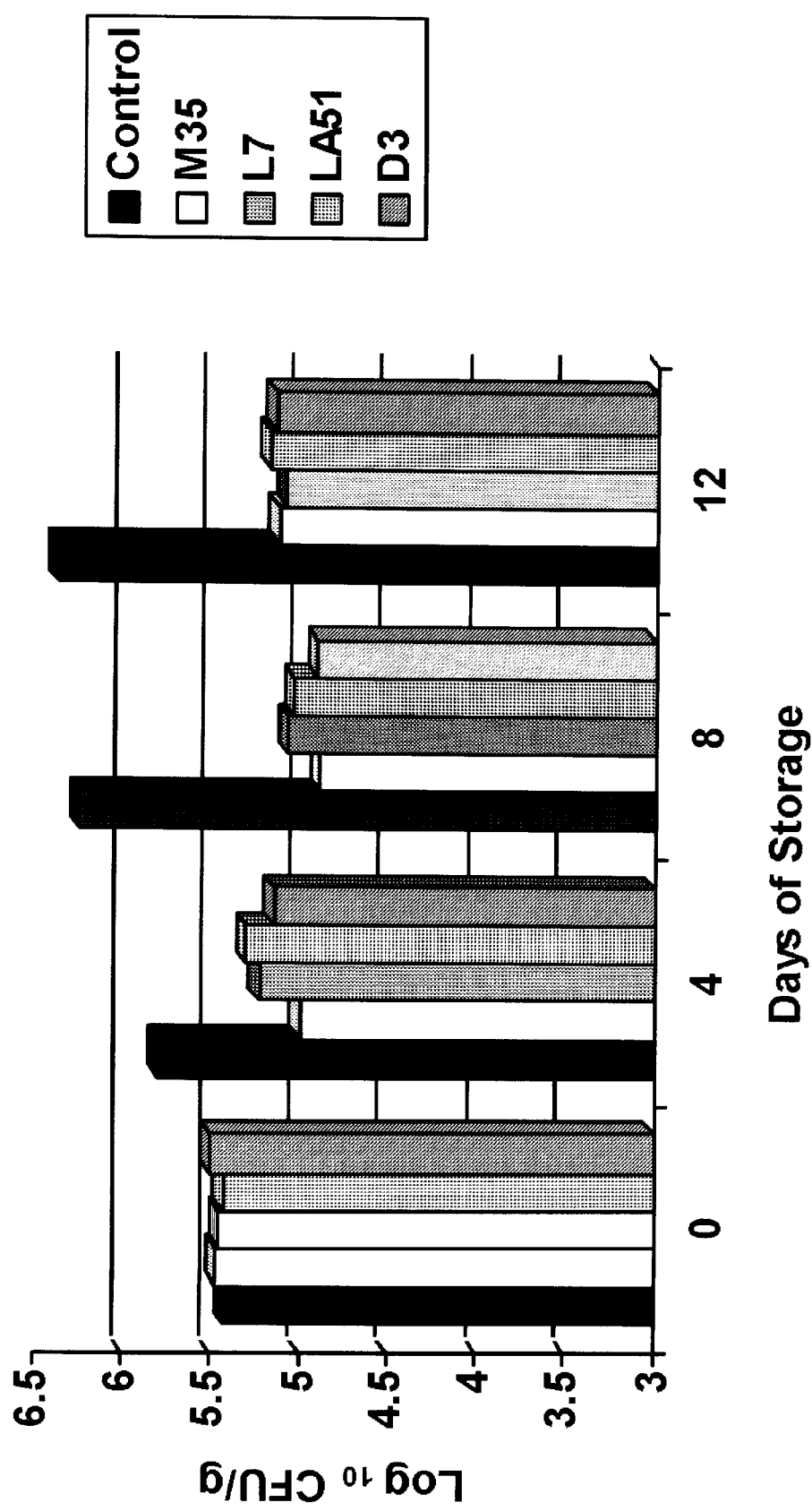
Figure 1. Competitive inhibition of *E. coli* O157 at 5 C in during a 12 day storage period

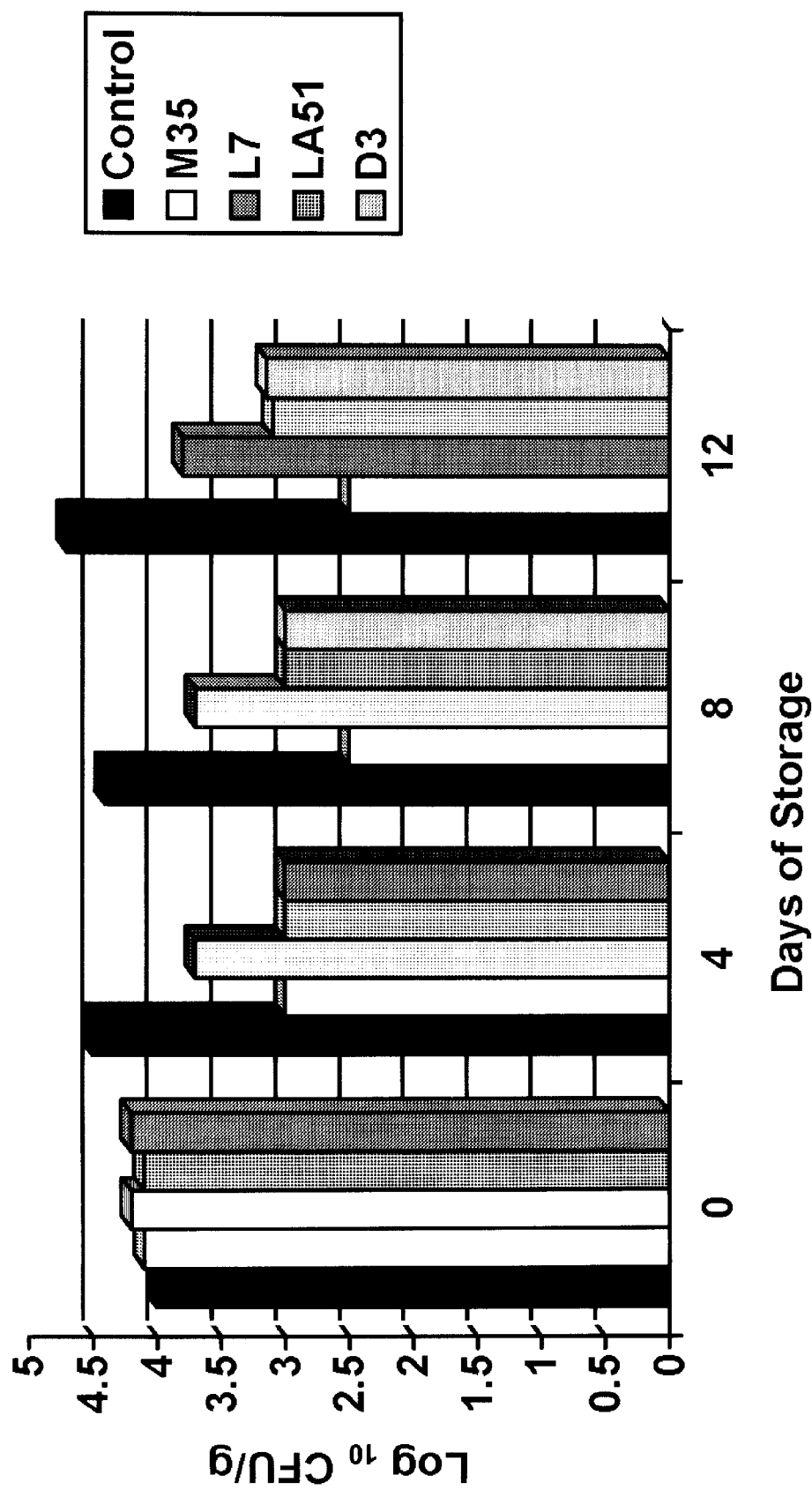
Figure 2. Competitive inhibition of *Salmonella* spp. at 5 C in ground beef during a 12 day storage period

COMPOSITIONS AND METHODS FOR REDUCING THE PATHOGEN CONTENT OF MEAT AND MEAT PRODUCTS

CROSS REFERENCE TO RELATED APPLICATIONS

The present application claims priority to U.S. Provisional Patent Application Ser. No. 60/319,838 filed Jan. 6, 2003, the contents of which are incorporated herein by reference.

BACKGROUND OF INVENTION

1. Field of the Invention

The invention relates to compositions and methods useful for reducing or eliminating the amount of pathogens in meat and meat products. More specifically, it relates to the addition of lactic acid producing organisms to animal feed, animal carcasses, and meat and meat products.

2. Description of Related Art

The processing and sale of meat is a major industry in the United States and around the world. Major meat products include beef, pork, chicken, and turkey. While efforts have been made to improve the safety of meat products, significant health concerns exist due in part to the presence of bacteria and other pathogenic contaminants.

From 1995 to 2000, the United States Department of Agriculture (USDA) issued 275 recalls for meat products, amounting to about 140 million pounds of adulterated meat that was present in the consumer market. Over 90% of the recalls were due to the detected presence of the potentially dangerous *E. coli* strain O157:H7. This bacteria was responsible for the 1993 outbreak traced to a Jack-in-the-Box restaurant in the Seattle area, in which four children died and 700 people became ill.

Animals are often fed antibiotics at low concentrations in an attempt to maintain their health and to promote growth. One side effect of this practice has been the emergence of antibiotic resistant pathogens. Drug resistant *Campylobacter* and *Salmonella* pathogens have been detected in cattle and poultry supplies. Treatment of people infected with these organisms often require aggressive multi-drug treatments. Vancomycin resistant enterococci (VRE) have been found in European livestock. The emergence of VRE in Europe is believed to have been at least in part due to the feeding of the antibiotic avoparcin to animals. Antibiotics have also been used in aquaculture. Farmed salmon, catfish, and trout have been treated with various antibacterial agents in the water.

The ingestion of pathogens in contaminated food products can lead to illness, and in some extreme cases, to death. This is of particular concern to individuals with compromised immune systems. While cooking often reduces the levels of bacteria and other pathogens to safe levels, food products are not always sufficiently cooked.

Pathogens that cause disease in the intestinal tract are known as enteropathogens. Examples of enteropathogenic bacteria, or enterobacteria, include *Staphylococcus aureus*, particular strains of *Escherichia coli* (*E. coli*), and *Salmonella* spp. Whereas most of the hundreds of strains of *E. coli* are harmless and live in the intestines of animals, including humans, some strains, such as *E. coli* O157:H7, O111:H8, and O104:H21, produce large quantities of powerful shiga-like toxins that are closely related to or identical to the toxin produced by *Shigella dysenteriae*. These toxins can cause severe distress in the small intestine, often resulting in damage to the intestinal lining and resulting in extreme cases of diarrhea. *E. coli* O157:H7 can also cause acute hemorrhagic colitis, characterized by severe abdominal cramping and abdominal bleeding. In children, this can progress into the rare but fatal disorder called hemolytic uremic syndrome ("HUS"), characterized by renal failure and hemolytic anemia. In adults, it can progress into an ailment termed thrombotic thrombocytopenic purpura ("TTP"), which includes HUS, plus fever and neurological symptoms, and can have a mortality rate as high as fifty percent in the elderly.

Efforts have been made to improve the safety of meat products. For example, the USDA instituted the Hazard Analysis and Critical Control Point (HACCP) inspection system in 1998. The HACCP requires that meat producers conduct scientific testing of *E. coli* and *Salmonella* levels in produced meat.

Reduction of risk for illnesses due to food borne pathogens can be achieved by controlling points of potential contamination. The beef industry has recognized the need to investigate pre-harvest control of pathogens, particularly *E. coli* O157:H7, due to potential runoff contamination, contact with humans, and the transfer of pathogens during meat processing. In particular, undercooked or raw hamburger (ground beef) has been implicated in many documented outbreaks as containing *E. coli* O157:H7.

Thus, there exists a need for improved materials and methods for minimizing or preventing the occurrence of pathogens in food products. This reduction can be accomplished either while the animal is still alive by minimizing the exposure of the animal to pathogens, or after processing of the meat by preventing or minimizing contamination of the meat products. These reductions or eliminations of pathogen occurrence in meat products will better protect the health and safety of the meat eating population.

SUMMARY OF INVENTION

Meat and meat products can be treated (contacted) with one or more microorganisms to inhibit or prevent the growth of potentially harmful pathogens. This inhibition can reduce or eliminate illnesses resulting from ingestion of the meat or meat products. Microorganisms that produce lactic acid have been found to be particularly attractive for the inhibition of pathogens in meat and meat products. The microorganisms can be administered to animals as part of their feedstock, can be applied to the animal carcass prior to and/or during processing, and/or can be added to the meat and meat products after processing. Synergistic effects can be achieved with the administration of multiple strains of microorganisms, as well as the utilization of multiple or repetitive contacts (a chain of contacts) with the subject anti-pathogen microorganisms prior to human consumption of the produced meat such as at the animal feed level, the living animal level, the animal carcass level, and/or the meat processing level which includes pre- and post-production processes such as butchering, packaging and transport and storage.

BRIEF DESCRIPTION OF DRAWINGS

The following figures form part of the present specification and are included to further demonstrate certain aspects of the present invention. The invention may be better understood by reference to one or more of these figures in combination with the detailed description of specific embodiments presented herein.

FIG. 1 shows inhibition of *E. coli* O157:H7 in ground beef at 5° C. during a 12 day storage period.

FIG. 2 shows inhibition of *Salmonella* spp. in ground beef at 5° C. during a 12 day storage period.

DETAILED DESCRIPTION

Several conceptual approaches towards reducing or eliminating the amount of potentially harmful pathogens in meat and meat products exist. The first involves preventing the contact of pathogen and animal while the animal is still alive. This approach can involve improving the cleanliness of the animal's environment, administering antibiotics, or by adjusting the environment to be less hospitable to the pathogens. The second is to prevent the contact of pathogen and meat or meat products during processing. This approach can involve improved cleanliness of the processing facility, adding antibiotics, and sterilization using radiation, bleach, or other chemicals. The third is to prevent the contact of pathogen and meat or meat products after processing. This approach can involve improvements in packaging, storage, and shipping methods.

As used herein, the term "pathogens" refers to any bacterium that produces a harmful effect in a host animal, and especially those bacteria that infect meat and dairy animals and subsequently infect the human food supply, thus causing disease in humans.

Aspects of the instant invention involve the administration of one or more lactic acid producing microorganisms to animals, meat, and meat products to reduce or eliminate the amount of potentially harmful pathogens in the meat and meat products. The microorganisms may compete with the pathogens for necessary nutrients, may compete with the pathogens for binding sites in the animal or meat, may produce chemical or biological agents toxic to the pathogens, or inhibit growth of the pathogen by other means.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

In one embodiment of the invention, the microorganisms are added to the feed or drink of a living animal. The animal consumes (i.e. eat or drink) the feed or drink (e.g. water), and the amount of pathogens present in the animal are reduced or eliminated. The reduction can occur in the digestive track of the animal, or in the animal as a whole. The reduction can generally be any amount of reduction, as compared to the amount of pathogen present prior to consumption of the feed. Alternatively, the reduction can be measured relative to the pathogen level from an animal fed a similar feed lacking the microorganisms.

In an alternative embodiment of the invention, the microorganisms can be added to the carcass of an animal prior to processing. The addition can be performed in generally any method. Methods can include spraying a liquid composition, spraying a dried composition, and "painting" a liquid composition using a brush or similar article. The concentration of the microorganisms in the liquid or dry composition can generally be any concentration. The concentration is preferably sufficient to achieve the desired reduction in amount of pathogens in the meat or meat product. The reduction can be measured relative to the pathogen level prior to administration of the microorganisms, or relative to a similar carcass that was not treated with the microorganisms. The concentration of microorganisms can be adjusted depending on the volume of composition applied. After processing of the meat or meat product, it is preferably maintained with proper refrigeration.

In a further alternative embodiment of the invention, the microorganisms are added to meat or to a meat product after processing. The addition can be performed in generally any method. Methods can include spraying a liquid composition, spraying a dried composition, and "painting" a liquid composition using a brush or similar article. The concentration of the microorganisms in the liquid or dry composition can generally be any concentration. The concentration is preferably sufficient to achieve the desired reduction in amount of pathogens in the meat or meat product. The reduction can be measured relative to the pathogen level prior to administration of the microorganisms, or relative to a similar meat or meat product that was not treated with the microorganisms. The concentration can be adjusted depending on the volume of composition applied. After processing of the meat or meat product, it is preferably maintained with proper refrigeration.

In yet an additional alternative embodiment of the invention, the microorganisms are administered to the animal prior to slaughter and processing. The administration can generally be by any form of administration. Examples of such an administration include topical, injection (e.g. IP, IV, IM), and transdermal administration. The administration can be in a single administration or multiple administrations. The administration can be in a time-release formulation. The concentration of the administered microorganisms can generally be any concentration. The concentration is preferably sufficient to achieve the desired reduction in amount of pathogens in the meat or meat product. The reduction can be measured relative to the pathogen level prior to administration of the microorganisms, or relative to a similar meat or meat product obtained from animals that were not administered the microorganisms. The concentration can be adjusted depending on the volume of composition administered. After processing of the meat or meat product, it is preferably maintained with proper refrigeration.

For the above-described methods, a reduction in pathogen content or concentration in the meat or meat product is achieved relative to control samples. The reduction can be measured in any manner commonly used in the art. Typically, pathogen concentrations are measured in colony forming units (CFU) obtained from a fixed quantity of meat or meat product. For example, the reduction can be at least about 5%, at least about 10%, at least about 20%, at least about 30%, at least about 40%, at least about 50%, at least about 60%, at least about 70%, at least about 80%, at least about 90%, at least about 95%, at least about 99%, at least about 99.9%, at least about 99.99%, or ideally about 100%. The reduction can also be ranges between any two of these values. Alternatively, the reduction can be measured in "log cycles." Each log reduction in concentration is equal to a ten-fold reduction (e.g. a one log reduction is a ten-fold reduction; a two log reduction is a 100-fold reduction, etc.). The log cycle reduction can be at least about 0.5, at least about 1, at least about 1.5, at least about 2, at least about 2.5, at least about 3, at least about 3.5, at least about 4, and ranges between any two of these values. Log cycle reductions can be easily converted to percent reduction. A 1 log cycle reduction is equal to 90%, a 2 log cycle reduction is equal to 99%, a 3 log cycle reduction is equal to 99.9%, and so on.

The animal can generally be any animal used in the food industry. The animals can include cattle (beef), pigs, chickens, turkeys, lamb, deer, buffalo, alligator, and snake. The animal can also be a fish or shellfish. Animals raised in aquaculture or caught in the wild include fish and shellfish such as salmon, catfish, trout, flounder, haddock, cod, mackerel, tuna, swordfish, shark, squid, clams, scallops, mussels, oysters, abalone, lobster, shrimp, crabs, and crayfish. The meat product can generally be any ground or processed meat product, including ground beef ("hamburger"), ground turkey, ground chicken, beef sausage, pork sausage, chicken sausage, hot dogs, and bologna.

The lactic acid producing microorganisms can generally be any lactic acid producing microorganisms. Families of microorganisms include *Bacillus, Bifidobacterium, Lactobacillus, Pediococcus,* and *Streptococcus*. For example, the microorganisms can be *Bacillus subtilis, Bifidobacterium adolescentis, Bifidobacterium animalis, Bifidobacterium bifudum, Bifidobacterium infantis, Bifidobacterium longum, Bifidobacterium thermophilum, Lactobacillus acidophilus, Lactobacillus agilis, Lactobacillus alactosus, Lactobacillus alimentarius, Lactobacillus amylophilus, Lactobacillus amylovorans, Lactobacillus amylovorus, Lactobacillus animalis, Lactobacillus batatas, Lactobacillus bavaricus, Lactobacillus bifermentans, Lactobacillus bifidus, Lactobacillus brevis, Lactobacillus buchnerii, Lactobacillus bulgaricus, Lactobacillus catenaforme, Lactobacillus casei, Lactobacillus cellobiosus, Lactobacillus collinoides, Lactobacillus confusus, Lactobacillus coprophilus, Lactobacillus coryniformis, Lactobacillus corynoides, Lactobacillus crispatus, Lactobacillus curvatus, Lactobacillus delbrueckii, Lactobacillus desidiosus, Lactobacillus divergens, Lactobacillus enterii, Lactobacillus farciminis, Lactobacillus fermentum, Lactobacillus frigidus, Lactobacillus fructivorans, Lactobacillus fructosus, Lactobacillus gasseri, Lactobacillus halotolerans, Lactobacillus helveticus, Lactobacillus heterohiochii, Lactobacillus hilgardii, Lactobacillus hordniae, Lactobacillus inulinus, Lactobacillus jensenii, Lactobacillus jugurti, Lactobacillus kandleri, Lactobacillus kefir, Lactobacillus lactis, Lactobacillus leichmannii, Lactobacillus lindneri, Lactobacillus malefermentans, Lactobacillus mali, Lactobacillus maltaromicus, Lactobacillus minor, Lactobacillus minutus, Lactobacillus mobilis, Lactobacillus murinus, Lactobacillus pentosus, Lactobacillus plantarum, Lactobacillus pseudoplantarum, Lactobacillus reuteri, Lactobacillus rhamnosus, Lactobacillus rogosae, Lactobacillus tolerans, Lactobacillus torquens, Lactobacillus ruminis, Lactobacillus sake, Lactobacillus salivarius, Lactobacillus sanfrancisco, Lactobacillus sharpeae, Lactobacillus trichodes, Lactobacillus vaccinostercus, Lactobacillus viridescens, Lactobacillus vitulinus, Lactobacillus xylosus, Lactobacillus yamanashiensis, Lactobacillus zeae, Pediococcus acidlactici, Pediococcus pentosaceus, Streptococcus cremoris, Streptococcus discetylactis, Streptococcus faecium, Streptococcus intermedius, Streptococcus lactis,* or *Streptococcus thermophilus*. The lactic acid producing microorganism can be *Lactobacillus acidophilus*. The lactic acid producing microorganism can be a strain of *Lactobacillus acidophilus* such as the M35, LA45, LA51, L411, NPC 747, NPC 750, D3, and L7 strains.

The various embodiments of the invention include the application of one or more lactic acid producing microorganisms to the animal, meat, or meat products. The microorganisms can be different microorganisms and/or different strains. For example, one, two, three, four, five, six, and so on different microorganisms and/or strains can be applied. The multiple different microorganisms can be added sequentially or concurrently as a "cocktail." The application of multiple different microorganisms and/or different strains can lead to synergistic (rather than additive) desirable effects.

The pathogen(s) can generally be any pathogen potentially harmful to humans when ingested or otherwise contacted. For example, the pathogen can be an *E. coli* pathogen, a *Staphylococcus* pathogen, or a *Salmonella* pathogen. Specific examples of pathogens include *Salmonella typhirium, Staphylococcus aureus,* and *E. coli* O157:H 7.

The amount of microorganism administered to the animal, meat, or meat product can generally be any amount sufficient to achieve the desired reduction in amount of pathogen. For example, amounts of about $10^4$ cfu/gram meat, about $5\times10^4$ cfu/gram meat, about $10^5$ cfu/gram meat, about $5\times10^5$ cfu/gram meat, about $10^6$ cfu/gram meat, about $5\times10^6$ cfu/gram meat, about $10^7$ cfu/gram meat, about $5\times10^7$ cfu/gram meat, about $10^8$ cfu/gram meat, about $5\times10^8$ cfu/gram meat, about $10^9$ cfu/gram meat, about $5\times10^9$ cfu/gram meat, about $10^{10}$ cfu/gram meat, or ranges between any two of these values can be used. When added to animal feed, the amount of microorganism added can generally be any effective amount. The amount is presently preferred to be about $10^3$ cfu/gram feed to about $10^{10}$ cfu/gram feed. More narrow ranges can be about $10^5$ cfu/gram feed to about $10^8$ cfu/gram feed, or about $10^6$ cfu/gram feed to about $10^7$ cfu/gram feed.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Culture Assay Results

A study was performed to evaluate the reduction of *E. coli* O157:H7 in ground beef. Four strains of lactic acid producing microorganisms were tested individually, and in combination.

Assays were performed in laboratory media stored at 5° C. Results were corrected using untreated samples as controls. Frozen concentrated cultures of Lactobacillus spp. NPC 747 (LA51), NPC 750 (M35), D3, and L7, and a mixture of all four cultures were used. Nalidixic acid resistant *E. coli* O157:H7 was used as the model pathogen. An inocula of $10^7$ Cfu/ml of *Lactobacillus* was added to TSB broth containing $10^4$ cfu/ml *E. coli* O157:H7. When the mixture of four *Lactobacillus* cultures was used, each culture was added at one quarter concentration, to result in a combined concentration of $10^7$ cfu/ml. Samples were stored at 5° C. for ten days, with numbers of *E. coli* determined at days 0, 5, and 10. After five days of storage, no significant reduction in pathogen levels were observed. After ten days, all *Lactobacillus* strains reduced the *E. coli* by an average of 3 log cycles (a 99.9% reduction).

Example 2

Ground Beef Assay Results Using Individual Cultures

Ground beef samples were stored at 5° C. for 12 days to determine the impact of Lactic Acid Bacteria (LAB) on the growth and inhibition of *E. coli* O157:H7. After four days of storage, one of the LAB cultures, M35 resulted in significantly lower populations of *E. coli* O157:H7 compared to the control samples (FIG. 1). After 8 days of storage, the other three LAB cultures resulted in significant differences between control samples and treated samples with more than a 1.5 log difference (>90% reduction) between the control samples and the treated samples.

A more inhibitory effect was observed against *Salmonella* spp. After four days of storage, M35, LA51 and D3 resulted in significant reductions of *Salmonella* compared to the control samples (FIG. 2). Each of these resulted in a 1.5 log reduction after 4 days of storage at refrigeration temperatures. After eight days of storage, M35 resulted in a 2.0 log difference (99% reduction) compared to the control and even more inhibition was observed on day 12 with more than a 2.0 log reduction. All LAB cultures except for L7 resulted in significantly lower populations of *Salmonella* compared to the control on days 8 and 12.

Preliminary results obtained by using a combined cocktail containing all 4 cultures at a higher inoculation level show more than a 3.0 log reduction (99.9%) of *E. coli* and a 4.0 log reduction (99.99% reduction) of *Salmonella*.

Example 3

Ground Beef Assay Results Using Combined Cultures

Further tests were performed to determine if four strains of lactic acid bacteria (LAB) inhibited *E. coli* O157:H7 in laboratory media and in ground beef at 5° C. Frozen concentrated cultures of four *Lactobacillus* spp, NPC 747, NPC 750, D3, and L7 and a cocktail mixture of four strains of nalidixic acid resistant *E. coli* O157:H7 were used in this study. Nalidixic acid resistant strains of *E. coli* O157:H7 were used to facilitate recovery on non-selective media in the presence of the background flora.

A $10^7$ cfu/ml portion of individual isolates of the LAB were added to TSB broth containing $10^4$ *E. coli* O157:H7/ml. Samples were stored at 5° C. and the numbers of *E. coli* O157:H7 were determined on days 0, 5 and 10. After 5 days of storage, there were no significant reductions in the pathogen. However after 10 days of storage, all LAB reduced *E. coli* O157:H7 by an average of 3 log cycles (99.9% reduction).

A second study was conducted in vacuum-packaged fresh ground beef. Samples were taken on days 0, 7, and 14. The following table illustrates the reduction in *E. coli* content achieved by treatment of ground beef with LAB. The experiment was conducted in triplicate. Numerical values are $Log_{10}$cfu *E. coli* O157:H7 per gram of ground beef.

|  |  | Days at 5° C. | | |
|---|---|---|---|---|
|  |  | 0 | 7 | 14 |
| Rep 1 | LAB | 4.58 | 1.01 | 2.41 |
|  | Control | 4.72 | 4.73 | 5.16 |
| Rep 2 | LAB | 5.32 | 4.94 | 1.25 |
|  | Control | 5.64 | 5.25 | 5.05 |
| Rep 3 | LAB | 4.59 | 4.58 | 3.26 |
|  | Control | 5.16 | 5.95 | 5.93 |
| Average | LAB | 4.83 | 3.51 | 2.31 |
|  | Control | 5.17 | 5.31 | 5.38 |

The individual isolates resulted in an average reduction of 2 logs (99% reduction) after 14 days of storage with little reductions after 7 days of storage. Following this study, a mixed concentrated culture was prepared from all four LAB and added to *E. coli* O157:H7 inoculated ground beef. After 7 days of storage, the mixed culture resulted in a 2 log reduction (99% reduction) of *E. coli* O157:H7 as compared to the control, and a 3 log reduction (99.9% reduction) after 14 days of storage. These results indicate that adding LAB to raw ground beef stored at refrigeration temperatures may be an important intervention to control *E. coli* O157:H7. These results are also surprising, as they suggest a synergistic, rather than additive effect achieved by combining different strains of microorganisms.

Example 4

Taste Evaluation of Treated Meat Products

Meat and meat products treated with one or more lactic acid producing microorganisms can be evaluated for their taste by an "organoleptic panel". It is preferred that the microorganisms be present at a level sufficiently low as to be undetectable by taste.

Example 5

Treatment of Beef Steaks with Powdered Compositions

Beef steak can be sprayed with a fine powdered composition containing one or more lactic acid producing microorganisms prior to packaging. The packaged steak is maintained at refrigerated temperatures during shipping and sale. The packaged steak can be assayed to determine reduction in pathogen content, relative to an untreated, but otherwise similarly handled steak.

Example 6

Treatment of Pork with Powdered Compositions

Cut pork can be sprayed with a liquid composition containing one or more lactic acid producing microorganisms prior to packaging. The packaged pork is maintained at refrigerated temperatures during shipping and sale. The packaged pork can be assayed to determine reduction in pathogen content, relative to an untreated, but otherwise similarly handled pork product.

Example 7

Treatment of Ground Beef with Powdered Compositions

Ground beef ("hamburger") can be mixed with a fine powdered composition containing one or more lactic acid producing microorganisms prior to packaging. The packaged hamburger is maintained at refrigerated temperatures during shipping and sale. The packaged hamburger can be assayed to determine reduction in pathogen content, relative to an untreated, but otherwise similarly handled hamburger product.

Example 8

Treatment of Ground Turkey with Liquid Compositions

Ground turkey can be mixed with a liquid composition containing one or more lactic acid producing microorganisms prior to packaging. The packaged ground turkey is maintained at refrigerated temperatures during shipping and sale. The packaged ground turkey can be assayed to determine reduction in pathogen content, relative to an untreated, but otherwise similarly handled ground turkey product.

Example 9

Treatment of Animal Carcasses Prior to Processing

A cattle carcass can be sprayed with a fine powdered composition containing one or more lactic acid producing microorganisms prior to processing. The processed beef can be assayed to determine reduction in pathogen content, relative to an untreated, but otherwise similarly handled cattle carcass.

Example 10

Animal Feedstuffs Containing Microorganisms

Cattle feed can be mixed with a dry or liquid composition containing one or more lactic acid producing microorganisms. The cattle can be processed, and the resulting beef and beef products can be assayed to determine reduction in pathogen content, relative to cattle fed an untreated, but otherwise similar diet.

Example 11

Water Containing Microorganisms

Pigs can be provided water containing one or more lactic acid producing microorganisms. The pigs can be processed, and the resulting pork and pork products can be assayed to determine reduction in pathogen content, relative to pigs provided untreated water.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the scope and concept of the invention.

The invention claimed is:

1. A method for reducing the pathogen content of a meat product, the method comprising contacting the meat product with at least one lactic acid producing microorganism, wherein the meat product is unprocessed meat, fish, shellfish, or a processed meat material, and wherein the lactic acid producing microorganism comprises a *Lactobacillus acidophilus, Lactococcus Lactis,* or *Pediococcus acidilactici* microorganism selected from the group consisting of M35, LA45, LA51, L411, D3, and L7.

2. The method of claim 1, wherein the pathogen content of the meat product after the contacting step is less than the pathogen content of the meat product before the contacting step.

3. The method of claim 1, wherein the pathogen is an *E. coli* pathogen, a *Staphylococcus* pathogen, or a *Salmonella* pathogen.

4. The method of claim 1, wherein the pathogen is *Salmonella typhirium, Staphylococcus aureus,* or *E. coli* O157:H7.

5. The method of claim 1, wherein the unprocessed meat is beef meat, pig meat, chicken meat, turkey meat, lamb meat, deer meat, buffalo meat, alligator meat, or snake meat.

6. The method of claim 1, wherein the fish is salmon, catfish, trout, flounder, haddock, cod, mackerel, tuna, swordfish, shark, or squid.

7. The method of claim 1, wherein the shellfish is clam, scallop, mussel, oyster, abalone, lobster, shrimp, crab, or crayfish.

8. The method of claim 1, wherein the processed meat material is ground beef, ground turkey, ground chicken, beef sausage, pork sausage, chicken sausage, hot dogs, or bologna.

9. The method of claim 1, wherein the contacting step comprises contacting the meat product with two or more lactic acid producing microorganisms.

10. The method of claim 1, wherein the contacting step comprises spraying a liquid composition, spraying a dried composition, or painting a liquid composition.

11. The method of claim 1, wherein the contacting step comprises applying the at least one lactic acid producing microorganism to the meat product at a concentration of about $10^4$ cfu/gram meat product to about $10^{10}$ cfu/gram meat product.

12. The method of claim 1, wherein the lactic acid producing microorganism comprises a *Lactobacillus* microorganism, or a *Pediococcus* microorganism.

13. The method of claim 1, wherein the lactic acid producing microorganism comprises a *Lactobacillus* microorganism.

14. The method of claim 1, wherein the lactic acid producing microorganism comprises a *Lactobacillus acidophilus* microorganism.

15. A method for reducing the pathogen content of meat or a meat product, the method comprising: selecting an animal carcass; contacting the animal carcass with at least one lactic acid producing microorganism; and processing the animal carcass to produce meat or a meat product, and wherein the lactic acid producing microorganism comprises a *Lactobacillus acidophilus, Lactococcus Lactis,* or *Pediococcus acidilactici* microorganism selected from the group consisting of M35, LA45, LA51, L411, D3, and L7.

16. The method of claim 15, wherein the pathogen content of the meat or meat product is less than the pathogen content of the animal carcass.

17. The method of claim 15, wherein the pathogen is an *E. coli* pathogen, a *Staphylococcus* pathogen, or a *Salmonella* pathogen.

18. The method of claim 15, wherein the pathogen is *Salmonella typhirium*, *Staphylococcus aureus*, or *E. coli* O157:H7.

19. The method of claim 15, wherein the animal carcass is a cattle carcass, a pig carcass, a chicken carcass, a turkey carcass, a lamb carcass, a deer carcass, a buffalo carcass, an alligator carcass, or a snake carcass.

20. The method of claim 15, wherein the meat is beef meat, pig meat, chicken meat, turkey meat, lamb meat, deer meat, buffalo meat, alligator meat, or snake meat.

21. The method of claim 15, wherein the meat product is ground beef, ground turkey, ground chicken, beef sausage, pork sausage, chicken sausage, hot dogs, or bologna.

22. The method of claim 15, wherein the contacting step comprises contacting the animal carcass with two or more lactic acid producing microorganisms.

23. The method of claim 15, wherein the contacting step comprises spraying a liquid composition, spraying a dried composition, or painting a liquid composition.

24. The method of claim 15, wherein the contacting step comprises applying the at least one lactic acid producing microorganism to the animal carcass at a concentration of about $10^4$ cfu/gram animal carcass to about $10^{10}$ cfu/gram animal carcass.

25. The method of claim 15, wherein the lactic acid producing microorganism comprises a *Lactobacillus* microorganism, or a *Pediococcus* microorganism.

26. The method of claim 15, wherein the lactic acid producing microorganism comprises a *Lactobacillus* microorganism.

27. The method of claim 15, wherein the lactic acid producing microorganism comprises a *Lactobacillus acidophilus* microorganism.

* * * * *